United States Patent
Wright

(10) Patent No.: US 11,368,571 B1
(45) Date of Patent: Jun. 21, 2022

(54) DENSE AUDIENCE INTERACTION DEVICE AND COMMUNICATION METHOD

(71) Applicant: NYMBUS, LLC, Pittsburgh, PA (US)

(72) Inventor: David Wright, Pittsburgh, PA (US)

(*) Notice: Subject to any disclaimer, the term of this patent is extended or adjusted under 35 U.S.C. 154(b) by 30 days.

(21) Appl. No.: 16/809,613

(22) Filed: Mar. 5, 2020

Related U.S. Application Data

(60) Provisional application No. 62/814,335, filed on Mar. 6, 2019.

(51) Int. Cl.
  *H04M 3/42* (2006.01)
  *H04M 1/72412* (2021.01)
  *H04L 51/52* (2022.01)

(52) U.S. Cl.
  CPC ........ *H04M 1/72412* (2021.01); *H04L 51/32* (2013.01)

(58) Field of Classification Search
  CPC ............................ H04M 1/7253; H04L 51/32
  USPC ....................................................... 455/414.1
  See application file for complete search history.

(56) References Cited

U.S. PATENT DOCUMENTS

| | | |
|---|---|---|
| 6,433,483 B1 | 8/2002 | Michael et al. |
| 6,717,376 B2 * | 4/2004 | Lys .......................... B60Q 3/30 315/292 |
| 7,856,235 B2 | 12/2010 | Syrjarinne |
| 8,233,919 B2 | 7/2012 | Haag et al. |
| 8,238,869 B2 | 8/2012 | Brayton |
| 8,249,549 B1 | 8/2012 | Rahman et al. |
| 8,254,877 B2 | 8/2012 | Edge et al. |
| 8,254,879 B2 | 8/2012 | Wijayanathan et al. |
| 8,295,866 B2 | 10/2012 | Obuchi et al. |
| 8,502,480 B1 | 8/2013 | Gerszberg et al. |
| 8,941,332 B2 | 1/2015 | Gerszberg |
| 9,066,383 B2 | 6/2015 | Gerszberg |
| 9,474,137 B1 * | 10/2016 | Wein ..................... G09F 27/005 |
| 9,686,843 B2 * | 6/2017 | Van De Sluis ....... H05B 47/155 |
| 9,843,744 B2 * | 12/2017 | Ackley .................... H04N 5/33 |
| 10,003,485 B2 * | 6/2018 | Lu ......................... H05B 47/155 |
| 10,405,404 B1 * | 9/2019 | Trickier ................ H04L 67/125 |
| 10,499,201 B2 * | 12/2019 | McHugh ................. H04W 4/08 |
| 10,681,198 B2 * | 6/2020 | Wright ............. H04M 1/72403 |
| 10,735,298 B2 * | 8/2020 | Chen .................... A61B 5/4806 |
| 2005/0211068 A1 | 9/2005 | Zar |
| 2008/0261572 A1 | 10/2008 | Tsui et al. |
| 2009/0309711 A1 | 12/2009 | Adappa et al. |

(Continued)

OTHER PUBLICATIONS

Bernhard Buchli, Felix Sution, and Jan Beutel, "GPS-Equipped Wireless Sensor Network Node for High-Accuracy Positioning Applications", EWSN 2012, LNCS 7158, pp. 179-195, 2012.

(Continued)

*Primary Examiner* — Amancio Gonzalez

(57) ABSTRACT

A first wearable accessory has a first lighting device. A mobile device is in close proximity to the first wearable accessory and has a lighting component communicating with the first wearable accessory via coded identifiable promiscuous broadcast to instruct the first wearable accessory to light the first lighting device. A second wearable accessory is in close proximity to the mobile device and having a second lighting component. The mobile device lighting component can be activated to communicate via an identical coded identifiable promiscuous broadcast with the second wearable accessory to instruct the second wearable accessory to light the second lighting device.

18 Claims, 4 Drawing Sheets

(56) References Cited

U.S. PATENT DOCUMENTS

| | | | |
|---|---|---|---|
| 2012/0088544 A1 | 4/2012 | Bentley et al. | |
| 2012/0163520 A1 | 6/2012 | Liu et al. | |
| 2013/0282839 A1 | 10/2013 | Alcala | |
| 2014/0171039 A1 | 6/2014 | Bjontegard | |
| 2014/0273858 A1 | 9/2014 | Panther et al. | |
| 2015/0289227 A1 | 10/2015 | Becker et al. | |
| 2016/0088440 A1 | 3/2016 | Palanki et al. | |
| 2016/0105923 A1 | 4/2016 | Chen et al. | |
| 2016/0150039 A1 | 5/2016 | Miettinen et al. | |
| 2016/0173440 A1 | 6/2016 | Stahura et al. | |
| 2016/0174857 A1 | 6/2016 | Eggers et al. | |
| 2016/0253044 A1 | 9/2016 | Katz | |
| 2016/0316542 A1* | 10/2016 | Wein | G06K 19/0702 |
| 2017/0172424 A1 | 6/2017 | Eggers et al. | |
| 2017/0180954 A1 | 6/2017 | McHugh | |
| 2018/0167656 A1* | 6/2018 | Ortiz | A63F 13/65 |

OTHER PUBLICATIONS

Johannes Schmid, Frederik Beutler, Benjamin Noack, Uwe D. Hanebeck, and Klaus D. Muller-Glaser, "An Experimental Evaluation of Position Estimation Methods for Person Localization in Wireless Sensor Networks", EWSN 2011, LNCS 6567, pp. 147-162, 2011.

Karimi, Hassan A. 2011. Universal Navigation on Smartphones. Springer, pp. 59-72.

Ryo Sugihara and Rajesh K. Gupta, "Clock Synchronization with Deterministic Accuracy Guarantee", EWSN 2011, LNCS 6567, pp. 130-146, 2011.

www.hurdl.com website landing page downloaded on Dec. 8, 2017.

www.xylobands.com/xylobands webpage downloaded on Jun. 18, 2020.

www.pixmob.com/products/detail/led-wristbands webpage downloaded on Jun. 18, 2020.

www.crowdled.net webpage downloaded on Jun. 18, 2020.

crowdsynctechnology.com/led-wristbands/webpage downloaded on Jun. 18, 2020.

www.glowmotiontechnologies.com webpage downloaded on Jun. 18, 2020.

theauraspark.com/ webpage downloaded on Jun. 18, 2020.

\* cited by examiner

DENSE AUDIENCE INTERACTION DEVICE AND COMMUNICATION METHOD

CROSS REFERENCE TO RELATED APPLICATION

This application claims the benefit under 35 U.S.C. § 119(e) of U.S. Provisional Application No. 62/814,335 entitled "WEARABLE ACCESSORY FOR USE IN AN AUDIENCE INTERACTION SYSTEM" filed Mar. 6, 2019, which is incorporated herein by reference.

BACKGROUND

Live audience interaction systems enable participants at live events to become more fully immersed in theatrical performances, concerts, professional sporting events, and other live events. Such audience interaction systems can include mobile devices, such as smartphones. Smartphones can be coupled with wearable accessories, such as bracelets, that include a variety of sensors and lighting devices. Like wearables in other domains, live event wearables have the potential to improve user experience, collect otherwise inaccessible participant data, facilitate ordinarily impossible audience participation, and transform common gestures into digital interactions that reverberate through social media, generating tens of thousands of dollars worth of social media marketing value from a single event.

Smartphones include many other features that could be used in audience interactive systems, including features that can produce online content and interact with a wide variety of APIs, including gaming and social media APIs. Some productions have utilized these features to provide online content meant to be accessed in tandem with the live experience. Similarly, virtual conversations have been created using Twitter hashtags during live concerts.

Smartphones introduce the potential for private interactivity between users, whether or not such users are in the venue. While this interactivity typically requires the user to input text data into the phone by tapping on the screen, smartphones can also receive input from wearable accessories to enhance the interactive experience provided by audience interaction systems.

Unfortunately, current smartphone interactions distract the user and detract from the immediate communal context of the live performance. For example, people who go to concerts often hold their phones aloft to take a low-quality picture or video and subsequently share the media by tediously drafting a social media post or text message. This distracts both the person interacting with their device as well as nearby audience members. Furthermore, according to a recent Harris Poll, thirty-one percent of people who are between the age of 18-34 are using their phones during half of an event or longer.

Since the advent of the smartphone, live performance spaces have been fundamentally and forever changed as the BYOD (bring your own device) audience now controls fifty-six times more technology than anything heretofore placed on stage. Existing audience interaction systems that include mobile devices and wearable accessories have many limitations due to the inherent challenges of live performance experience design. Effectively, consistently and positively transforming a large, connected audience into an integral part of a live performance through their mobile devices remains an unsolved challenge due to current methods of device input. Input through wearable devices presents a substantial opportunity to solve this challenge. However, audience density at large events is a debilitating technological challenge. Reliable point-to-point radio communication with and between hundreds to thousands of densely populated cellular phones and wearable devices presents a heretofore unsolved technical challenge. Current "connection" or "pairing" methods fail in such settings. Solving these user experience and technology challenges promises to exponentially increase the monetary and earned marketing value of live performances. As a result, there is a need for an improved audience interaction system that can allow audiences to participate en masse. Such a system would have an enormous potential to improve experiences, increase financial and earned marketing returns, and yield valuable data on live experiences.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computing system for participating in an interactive event includes a first wearable accessory having a first lighting device. A mobile device is in close proximity to the first wearable accessory and has a lighting component communicating via a promiscuous broadcast that includes a Personal Identification Number (PIN) with the first wearable accessory to instruct the first wearable accessory to light the first lighting device. A second wearable accessory, having a second lighting device, is in close proximity to the mobile device. The mobile device lighting component can be activated to communicate via repeated PIN associated promiscuous broadcast with the second wearable accessory to instruct the second wearable accessory to light the second lighting device.

In other implementations, a computer-implemented method for participating in an interactive event with a mobile device having a lighting component, a first wearable accessory having a first lighting device, and a second wearable accessory having a second lighting device includes transmitting instructions from the mobile device lighting component via repeated PIN associated promiscuous broadcast to the first wearable accessory to light the first lighting device. Instructions are transmitted via repeated PIN associated promiscuous broadcast from the mobile device lighting component, upon activation of the mobile device lighting component, to the second wearable accessory to light the second lighting device.

In yet other implementations, a mobile computing system for participating in an interactive event with a wearable accessory having a sensor. A mobile device communicates with the wearable accessory via repeated PIN associated promiscuous broadcast. A server has a social media platform thereon connects to the mobile device over a network. The sensor responds to an impulse to trigger the wearable accessory. The wearable accessory indicates to the mobile device via repeated PIN associated promiscuous broadcast to communicate with the server over the network to post output on the social media platform.

In other implementations, a computer-implemented method for participating in an interactive event is performed with a wearable accessory having a sensor, a mobile device, a server having a social media platform thereon, and a network. Messages between the mobile device and wearable are promiscuously broadcasted but identified via a short PIN number included in each message. The mobile device is connected to the server over the network. An impulse is detected with the wearable accessory sensor. A message is repeatedly sent via PIN associated promiscuous broadcast to the mobile device from the wearable accessory upon detection of the impulse to communicate with the server to post a status on the social media platform.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
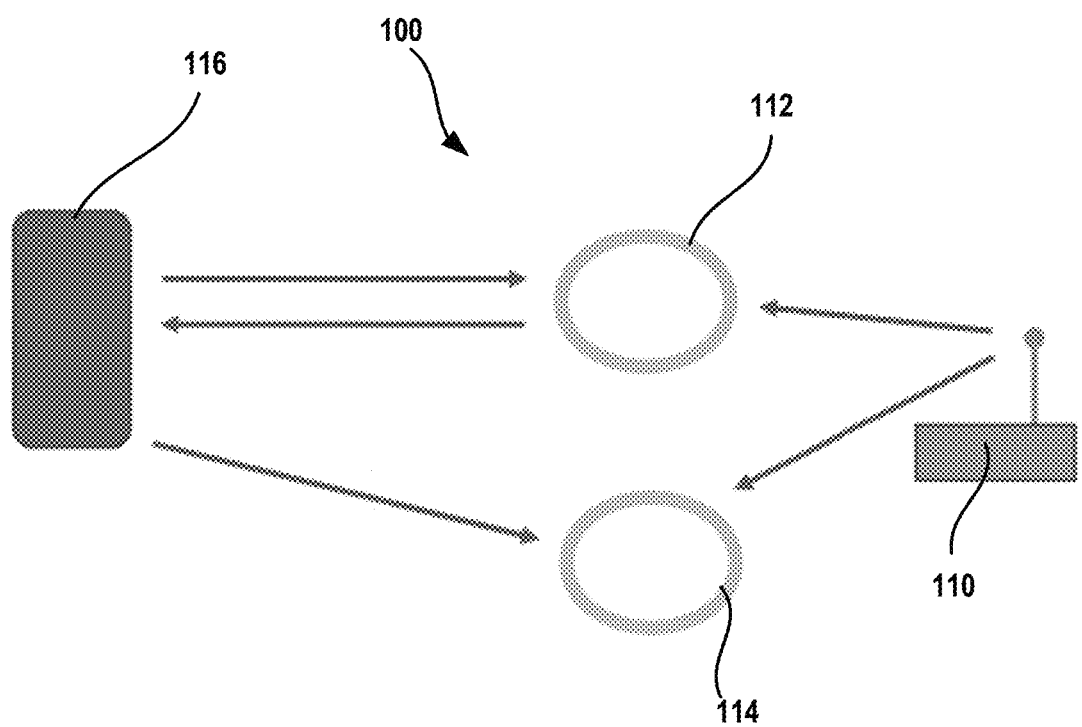
FIG. 1 illustrates a schematic diagram of an embodiment of an exemplary operating environment that can implement aspects of the described subject matter.

The subject disclosure is directed to an improved device and communication method for massive dense-audience interaction systems. More specifically, the subject disclosure is directed to a mobile device, such as a smartphone, that can communicate with a plurality of improved wearable accessories within an audience interaction system. The system uses radio technology ubiquitously found in mobile devices.

In some embodiments, the smartphone can be activated to light wearable accessories via repeated coded promiscuous broadcasts that are in close proximity within the interactive event environment. In other embodiments, one of the wearable accessories can include a motion sensor that detects impulses that can trigger the wearable accessory to alert the phone via repeated coded promiscuous broadcast that a movement has been sensed and the phone can in turn post status updates on social media. The audience interaction system can be the audience interaction system that is disclosed within U.S. patent application Ser. No. 15/684,500, entitled "Audience Interaction System and Method", filed Aug. 23, 2017.

The wearable accessories can be assigned individual device numbers or PINs. The messages that are sent via the coded promiscuous broadcasts can include the PINs to trigger the wearable accessories and/or flags to trigger neighboring wearable accessories. The use of such coded information is particularly effective to create live, interactive events as part of theatrical performances, concerts, professional sporting events, and other live event that have a high audience density and a corresponding high density of smartphones. The system is particularly useful in events in which the audience density and/or the smartphone density is massive.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example does not, necessarily, include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details. While certain components are shown in block diagram form to describe one or more aspects, it is to be understood that functionality performed by a single component can be performed by multiple components. Similarly, a single component can be configured to perform functionality described as being performed by multiple components.

An audience interaction system that uses the promiscuous wireless broadcast and listening capability of mobile devices, such as smartphones, to deliver and receive data to and from specific audience members at a live event has been developed. The audience interaction system utilizes smartphones that are capable of an astounding variety of interactions, including the ability to communicate with wearable accessories that can be used as lighting instruments. These communicating mobile computing systems can be incorporated into audience interaction systems to create overt interactions and to produce various effects, including "social pockets of light" visible to all spectators in a venue in which an interactive event takes place. Through the system, a fan can a selected color and flash pattern and initiate a sequence to light up his own wearable accessory or produce pockets of light of among specific, nearby wearables.

The term "communicating" can refer to an interaction between a wearable accessory and a mobile device in which the bracelet promiscuously broadcasts and the mobile device receives the broadcast or vice versa, but the term is not limited to such interactions.

The communicating mobile computing system can produce effects that involve displaying colors, displaying images, and flashings lights. Various effects have been described as Color, ColorFlash, CrossFade, Gradient, IntensityShake, Led, Strobe, TickerTape, Colorshake, Endshow, and AudioPlayback. The improved mobile computing systems that are the subject of this disclosure can produce a "share-your-light" effect in which input directly on a mobile device or a clap or similar movement detected on a wearable accessory and communicated to a mobile device triggers a mobile computing device to light the wearable accessory by itself or in conjunction with another wearable accessory. In some embodiments, the detection of the clap can result in social media posts.

Referring to FIG. 1, an exemplary operating environment, generally designated as 100, that can implement aspects of the described subject matter is illustrated. The operating environment 100 includes a broadcasting device 110, a pair of wearable accessories 112-114, and a mobile device 116. The broadcasting device 110 can be part of the audience interaction system disclosed U.S. patent application Ser. No. 15/684,500, entitled "Audience Interaction System and Method", filed Aug. 23, 2017, and can perform the functions of a cue trigger generator.

The broadcast device 110 can be configured to send timing information, lighting effects data and playback cues, in the form of data or data structures in some embodiments, to the wearable accessories 112-114 and/or to the mobile device 116. The broadcast device 110 can be a physical device (or a virtual device that controls a physical device) that has the ability to utilize a processor to convert input into a signal that corresponds to timing and lighting effects data or a playback cue that can be sent to the wearable accessories 112-114 and/or to the mobile device 116.

The wearable accessories 112-114 and/or to the mobile device 116 can respond to the broadcast data by synchronizing and internal clock, storing lighting effects data in memory or referencing playback cues to its own time to display colors, display images, flash and fade lights or by implementing other effects. The playback cues can be triggered at predetermined times and/or time increments. Alternatively, the playback cues can be triggered by an artist, musician, or other user at a preplanned time, in response to another cue or event, and/or spontaneously.

The wearable accessories 112-114 and/or the mobile device 116 can be coupled to one another within the operating environment 100. The terms "couple", "coupled", or "coupling" is used within its most expansive sense to refer to items that communicate with one another through an indirect connection. Such "coupled" items are not necessarily physically connected to one another or exclusively "paired" via a communication protocol. It is contemplated that in some embodiments, the wearable accessories 112-114 and/or the mobile device 116 can be coupled to one another to form a mobile computing system or mesh network.

Within the operating environment 100, the wearable accessories 112-114 can cooperate with the mobile device 116 to implement a "Share-your-light" effect. In some embodiments, the wearable accessories 112-114 must be within close proximity (i.e., less than 10 meters or 32 feet) of one another and within close proximity to the mobile device 116.

In operation, the wearable accessory 112 initiates the "Share-your-light" effect by responding to an impulse, a cue, or another triggering event. Upon detection of the triggering event, the wearable accessory 112 will send a message to the mobile device 116 to activate the effect. The mobile device 116 will send a message to the wearable accessory 114 to produce a light. Optionally, the wearable accessory 112 will light up in response to the triggering event.

The broadcast device 110, the mobile device 116, and/or portions thereof, can be implemented by various types of operating environments, computer networks, platforms, frameworks, computer architectures, and/or computing devices. For example, these devices can include components implemented by computer-executable instructions that are stored on one or more computer-readable storage media and that are executed to perform various steps, methods, and/or functionality in accordance with aspects of the described subject matter.

Implementations of the devices are described in the context of a system configured to perform various steps, methods, and/or functionality in accordance with aspects of the described subject matter. It is to be appreciated that a computer system can be implemented by one or more computing devices. Implementations of the devices can be described in the context of "computer-executable instructions" that are executed to perform various steps, methods, and/or functionality in accordance with aspects of the described subject matter.

In general, a computer system can include one or more processors and storage devices (e.g., memory and disk drives) as well as various input devices, output devices, communication interfaces, and/or other types of devices. A computer system also can include a combination of hardware and software. It can be appreciated that various types of computer-readable storage media can be part of a computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

The devices can implement and utilize one or more program modules. Generally, program modules include routines, programs, objects, components, data structures, etc., that perform particular tasks or implement particular abstract data types.

The devices can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

The devices can be implemented by one or more computing devices such as computers, PCs, server computers configured to provide various types of services and/or data stores in accordance with aspects of the described subject matter. Exemplary sever computers can include, without limitation: web servers, front end servers, application servers, database servers, domain controllers, domain name servers, directory servers, and/or other suitable computers.

The devices can be implemented within a cloud environment. Cloud environments can be provided by a cloud services provider (i.e., "the cloud"). In such cloud environments, data resources can be abstracted among or across one or more computers and/or computer networks that make up the cloud. Examples of cloud computing environments include S3 by Amazon.com.

The broadcasting device 110, the wearable accessories 112-114, and/or the mobile device 116 can be connected by one or more networks that can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network.

The wearable accessories 112-114 can be implemented as footwear (e.g., sneakers, rollerblades, ice skates, flip-flops, sandals, etc.); headwear (e.g., caps, hats, headbands, do rags, etc.); apparel (e.g., shirts, pants, jackets, shorts, bodysuits, etc.); jewelry (e.g., bracelets, watches, wristlets, earrings, necklaces, broaches, pins, buttons, button pins, etc.); other wearable items (e.g., wristbands, armbands, handkerchiefs, do-rags, etc.); accessories (e.g., eye glasses, sun glasses, bags, handbags, luggage, backpacks, briefcases, belts, suspenders/braces, glow sticks, holiday lights, lanyards, towels, bandanas, etc.). Most importantly, the wearable accessories 112-114 can be implemented as bracelets or wristbands.

The broadcast device 110 can send master broadcast messages that include RGB values to the wearable accessories 112-114. The wearable accessories 112-114 can be assigned codes, which can be four digit codes or five digit codes, to identify a particular wearable accessory or to target a wearable accessory to produce a specific lighting effect. In some embodiments, all of the lighting effects data, song data, and set data are broadcast to the wearable accessories 112-114 before the interactive event. The wearable accessories 112-114 store the data in memory. Then, during the interactive event, a cue to "GO" is sent to activate the wearable accessories 112-114 based upon a certain song or cue within a song. The wearable accessories 112-114 can retrieve the cue from memory, create a buffer and play the cue.

The mobile device 116 can communicate with the wearable accessories 112-114 to send periodic requests with a code corresponding to wearable accessory 112. The mobile device 116 can determine whether the wearable accessory 112 has detected a clap by a user.

The wearable accessories 112-114 can prioritize master broadcast messages from the broadcast device 110 over the requests from the mobile device 116. If wearable accessory 112 (or wearable accessory 114) does or does not receive its own bracelet code in a request from the mobile device 116, the wearable accessory 112 (or wearable accessory 114) can respond to the mobile device broadcast message for a predetermined period of time. In some embodiments, the predetermined period of time is 30 seconds.

Figure 2:
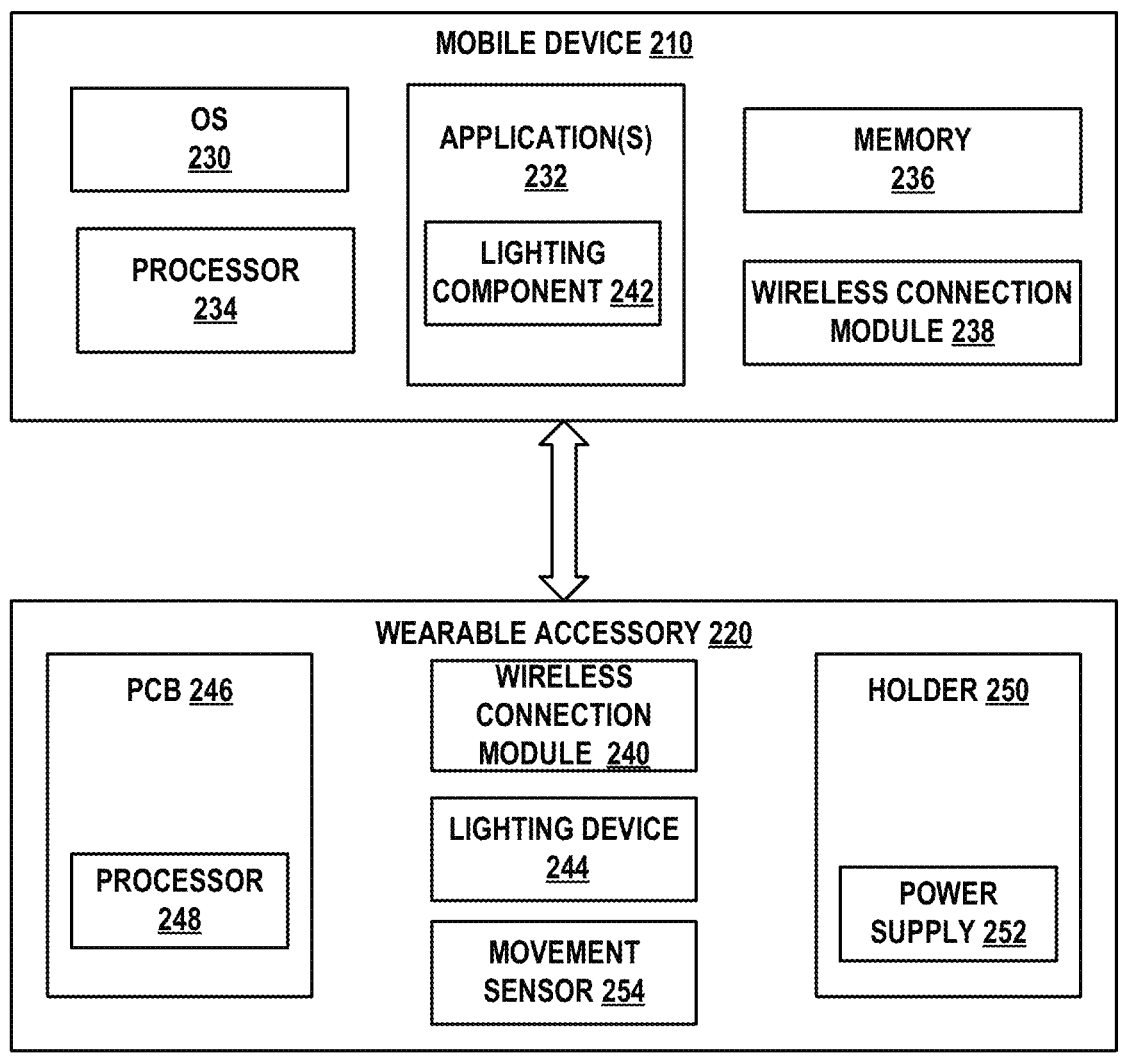
FIG. 2 illustrates an embodiment of an exemplary mobile computing system that can implement aspects of the described subject matter.

Referring now to FIG. 2 with continuing reference to the foregoing figure, a mobile computing system, generally designated by the numeral 200, is shown. The mobile computing system 200 can implement various effects within an operating environment, such as operating environment 100. In this exemplary embodiment, mobile computing system 200 can include a mobile device or mobile device 210 and a wearable accessory 220. The mobile device 210 can be the mobile device 116 shown in FIG. 1. The wearable accessory 210 can be one of the wearable accessories 112-114 shown in FIG. 1.

Mobile device 210 can include operating system 230 and various types of mobile application(s) 232. In some implementations, mobile application(s) 232 can include one or more client application(s) and/or components of a client application.

Mobile device 210 can include processor 234 for performing tasks such as signal coding, data processing, input/output processing, power control, and/or other functions, and memory 236 that can be used for storing data and/or code for running operating system 230 and/or mobile application(s) 232. Example data can include web pages, text, images, sound files, video data, or other data to be sent to and/or received from one or more network servers or other devices via one or more wired and/or wireless networks. Mobile device 210 can include a wireless connection module 238 that facilitates a connection to a wireless connection module 240 on the wearable accessory 220. In this exemplary embodiment, the wireless connection modules 238-240 can be a BLE module or Bluetooth® module that can implement a Bluetooth® connection between the mobile device 210 and the wearable accessory 220. The Bluetooth® connection can be achieved using Atmel® technology utilizing an Atmel® ATSAMB11 BLE module. Bluetooth® is a registered certification mark owned by Bluetooth Sig, Inc., of Kirkland, Wash. Atmel® is a registered trademark mark owned by Atmel Corporation of San Jose, Calif.

The application(s) 232 can include a lighting component 242. The lighting component 242 is a software application, program module, or other similar set of computer instructions that interfaces with a network connecting device or network connecting system for a mobile device to facilitate connections to hardware or a virtual device to download data structures to a mobile device, such as the mobile device 210. The lighting component 242 is particularly adapted to light a lighting device 244 on the wearable accessory 220 or on a neighboring wearable accessory (not shown), such as the wearable accessories 114-116 shown in FIG. 1. In this exemplary embodiment, the lighting device 244 is a light emitting diode or LED.

The wearable accessory 220 can include a printed circuit board 246 that includes a processor 248 and a holder 250 that holds a power supply 252. The power supply 252 can provide power to the printed circuit board 246 and the processor 248. The holder 250 can be a clip, wires, or other suitable devices. In some embodiments, the power supply 252 can include one or more batteries. In other embodiments, the power supply 252 must include at least two batteries, and the holder 250 is positioned below the printed circuit board 246 to extend therefrom. The holder 250 can be an integral structure with the wearable accessory 220. The printed circuit board 246 can be 28 mm×28 mm.

The wearable accessory 220 can configure and implement a movement sensor 254. The movement sensor 254 can trigger cues to implement interactive effects that give the audience the ability to manipulate effects on the wearable accessory 220 through simple gestures. The movement sensor 254 can be a shock sensor, an accelerometer, gyroscope, combined inertial measurement unit (IMU), or similar device. In some embodiments, the movement sensor 254 is a low cost, low energy consuming accelerometer.

Figure 3:
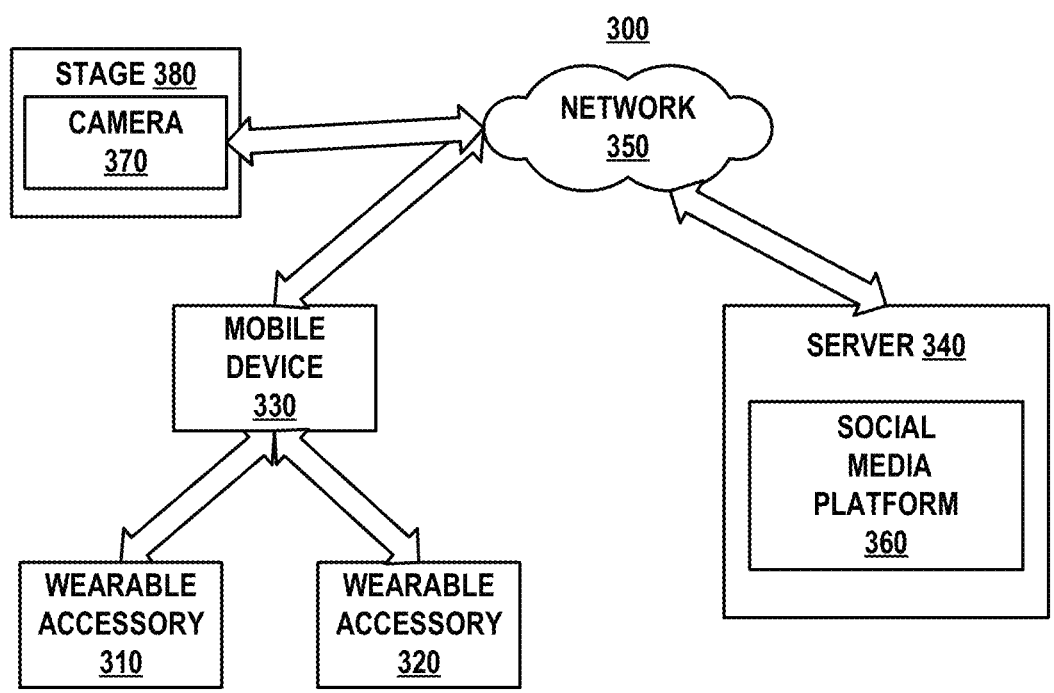
FIG. 3 illustrates an embodiment of an audience interaction system that can implement aspects of the described subject matter.

Referring to FIG. 3 with continuing reference to the foregoing figures, another exemplary operating environment, generally designated as 300, that can implement aspects of the described subject matter is illustrated. Like the operating environment 100 shown in FIG. 1, the operating environment 300 includes a pair of wearable accessories 310-320 and a mobile device 330. In this exemplary embodiment, the wearable accessories 310-320 are essentially identical to the wearable accessories 112-114 shown in FIG. 1 and/or the wearable accessory 220 shown in FIG. 2. The mobile device 330 is essentially identical to the mobile device 116 shown in FIG. 1 and/or the mobile device 210 shown in FIG. 2.

The wearable accessories 310-320 can be enabled to utilize the movement sensor 254 shown in FIG. 2 to respond to shocks or other impulses, such as human clapping, first pumps, high-fives and/or hand waving, to send impulses to mobile device 330 to prompt a connection to a server 340 through a network 350 directly or through mobile device 330. The server 340 can host a social media platform 360, so that the wearable accessories 310-320 and/or mobile device 330 can post a new status update on social media, a "like" on social media, a picture or video on social media, or a "share" on social media.

Social media platform 360 can be an Internet platform that allows users to post content and interact with one another. Users of social media platforms, such as social media platform 360, often have the ability to engage in conversations with other users privately or publicly; post pictures, videos, audio, links and other media; modify content; and utilize other functionality built into the platform. Some examples of social media platforms include Facebook by Facebook, Inc., Twitter by Twitter, Inc., TikTok by ByteDance, Ltd., Instagram by Facebook, Inc., Snapchat by Snap, Inc., and others.

The operating environment 300 can utilize this feature to produce social media posts that number in the thousands for moderately-sized interactive events. In such events, the wearable accessories 310-320 and the mobile devices 330 can number in the thousands and can communicate with one another over the Internet and/or through the use of Bluetooth® technology. Bluetooth® broadcast signals are typically absorbed by human bodies when such bodies are packed together within a large space in some types of interactive events. This absorption can lead to packet loss. Additionally, congestion from communication broadcasts of thousands of devices can also lead to packet loss. However, these technical limitations can be overcome by having the operating environment 300 randomly schedule requests for clap detection from the wearable accessories 310-320, having the wearable accessories 310-320 randomly broadcast their clap count including their unique PIN number, and by randomly posting to social media on the social media platform 360 over time.

The ability to post a massive number of status updates on the social media platform 360 can be immensely valuable. A single post from a fan to social media for a single interactive event can be worth S3.65, but an agglomeration of five thousand posts from individual fans, when done on command, with a controlled message, can multiply the value by 5000. Such massive posts can increase the value of social media engagement by an artist by an average of 55% and the engagement of a brand sponsor by an average of 123%.

The mobile device 330 can communicate with the wearable accessories 310-320 to send periodic requests with a code corresponding to wearable accessory 310. Alternately, the wearable accessories 310-320 can voluntarily promiscuously broadcast their movement event count with unique PIN number at random intervals. The mobile device 330 can determine whether the wearable accessory 310 has detected a clap by a user. If the mobile device 330 determines that the wearable accessory 310 has detected a clap, the mobile device 330 can communicate with server 340 through network 350 to post a message on social media platform 360.

It should be understood that in some configurations, the mobile device 330 can connect to the network 350 through a server that is configured like the server that is identified as numeral 120 in FIG. 1 of U.S. patent application Ser. No. 15/684,500, which was filed on Aug. 23, 2017, which can communicate with the server 340 and can post on the social media platform 360.

In such embodiments, a camera 370 can be mounted on a stage 380. The camera 370 can take a picture or video of the crowd or the stage that can be sent through the network 350 for posting on the social media platform 360. The mobile device 330 can direct the social media platform 360 to post the picture or video on one or more user pages when the wearable accessory 310 detects a clap.

The wearable accessory 310 can be configured to indicate to a user whether clapping will cause the picture to be posted to the social media platform 360. For example, the wearable accessory 310 can be configured to light up when clapping will cause the picture to be posted to social media. When the wearable accessory 310 is not lit, the user will know that clapping will not cause pictures to be posted to social media. A lighted wearable accessory 310 will indicate that the wearable accessory is monitoring for clapping events.

In other embodiments, the wearable accessory 310 can display a lighting pattern during a concert. The wearable accessory 310 can be configured to change the lighting pattern when it is monitoring for clapping to post to the social media platform 360 and/or after the wearable accessory 310 has posted to the social media platform 360.

In other embodiments, the wearable accessory 310 can implement an app that allows users to indicate whether they will provide the wearable accessory 310 with permission to post the picture to the social media platform 360. Then, the wearable accessory 310 will light up when the user provides permission to post to the social media platform 360. In such embodiments, the wearable accessory 310 can also be configured to light up when the picture is posted to the social media platform 360.

Figure 4:
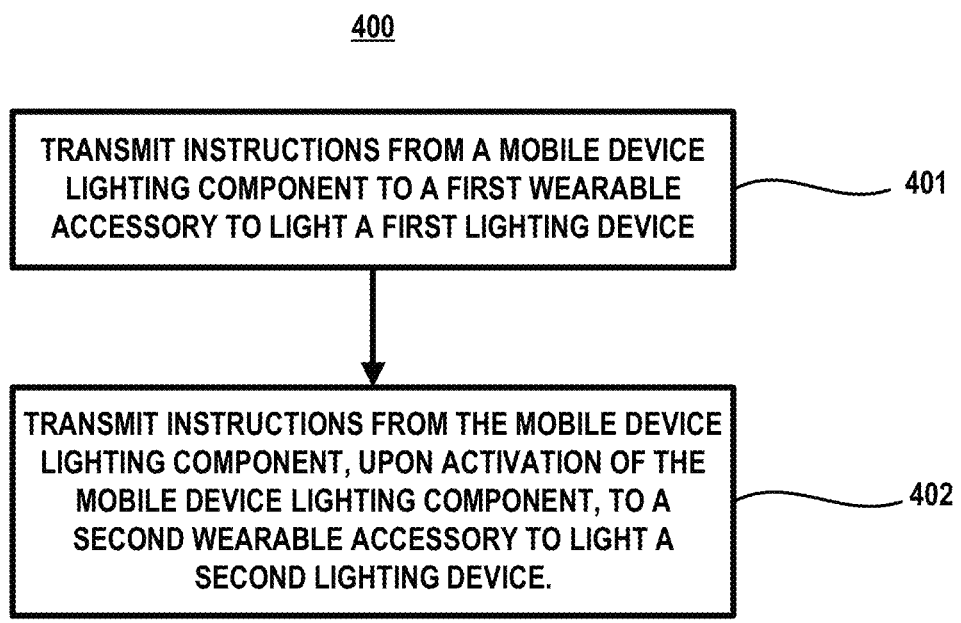
FIG. 4 illustrates an exemplary process in accordance with an embodiment of the invention.

Referring to FIG. 4 with continuing reference to the foregoing figures, a computer-implemented method 400 is illustrated as an embodiment of an exemplary audience interaction system in accordance with aspects of the described subject matter. Computer-implemented method 400, or portions thereof, can be performed by one or more computing devices, a computer system, computer-executable instructions, software, hardware, firmware or a combination thereof in various embodiments. For example, computer-implemented method 400 can be performed by wearable accessories 112-114 and mobile device 116 shown in FIG. 1, mobile device 210 and wearable accessory 220 shown in FIG. 2, and/or wearable accessories 310-320 and mobile device 330 shown in FIG. 3.

At 401, instructions are transmitted from a mobile device lighting component to a first wearable accessory to light a first lighting device. In this exemplary embodiment, the mobile device lighting component can be the mobile device lighting component 242 shown in FIG. 2 implemented on the mobile device 116 shown in FIG. 1, the mobile device 210 shown in FIG. 2, and/or the mobile device 330 shown in FIG. 3. The first wearable accessory can be the wearable accessory 112 shown in FIG. 1, the wearable accessory 220 shown in FIG. 2, and/or the wearable accessory 310 shown in FIG. 3. The first lighting device can be the lighting device 244, which can be controlled by the lighting component 242 on the mobile device 210 shown in FIG. 2. In some embodiments, the first lighting device can be a light emitting diode or LED.

At 402, instructions are transmitted from the mobile device lighting component, upon activation of the mobile device lighting component, to the second wearable accessory to light the second lighting device. The second lighting device can be the lighting device 244, which can be activated by the lighting component 242 on the mobile device 210 shown in FIG. 2. In some embodiments, the first lighting device can be a light emitting diode or LED.

Through the "share-your light" feature, a user can light up his or her bracelet for about 1 minute and can light up nearby bracelets for about 30 seconds in some embodiments. If the user logs onto a system app, the user can light up his own bracelet and nearby bracelets for as many times as the user chooses to do so, but only for about 1 minute at a time in other embodiments. In some embodiments, if the user does not log on to the system app, the user can light up his own bracelet again, but cannot illuminate nearby bracelets.

The "share-your-light" feature allows a user to control the illumination feature on a bracelet, even when that bracelet is coupled with another phone, if the illumination feature was produced, originally, by the user's phone. This promiscuous architecture is designed to facilitate and increase overt social interaction among event participants, accelerating the technology adoption lifecycle.

Additionally, some embodiments of the system can handle multiple light shows (i.e., illumination features) even while a user receives instructions to play a new light show from a neighboring phone while the user's phone is currently playing a light show. In such embodiments, the bracelet will pick up the new light show from another phone and will play the new light shown after it finishes playing its current light show.

Supported Embodiments and Features

The detailed description provided above in connection with the appended drawings explicitly describes and supports various embodiments and features of audience interaction in accordance with the described subject matter. By way of illustration and not limitation, supported embodiments include a computing system for participating in an interactive event comprising: a first wearable accessory having a first lighting device, a mobile device in close proximity to the first wearable accessory and having a lighting component communicating with the first wearable accessory to instruct the first wearable accessory to light the first lighting device, and a second wearable accessory in close proximity to the mobile device and having a second lighting component, wherein the mobile device lighting component can be activated to communicate with the second wearable accessory to instruct the second wearable accessory to light the second lighting device.

Supported embodiments include the foregoing mobile computing system, wherein the mobile device is a smartphone.

Supported embodiments include any of the foregoing mobile computing systems, wherein the first wearable accessory and second wearable accessory are identical to one another.

Supported embodiments include any of the foregoing mobile computing systems, wherein the first wearable accessory and the second wearable accessory are bracelets.

Supported embodiments include any of the foregoing mobile computing systems, wherein the first wearable accessory includes a board having a processor and a power source.

Supported embodiments include any of the foregoing mobile computing systems, wherein the power source includes a battery.

Supported embodiments include any of the foregoing mobile computing systems, wherein the first wearable accessory includes a reset switch.

Supported embodiments include any of the foregoing mobile computing systems, wherein the first lighting device is a light emitting diode.

Supported embodiments include any of the foregoing mobile computing systems, wherein the second lighting device is a light emitting diode.

Supported embodiments include any of the foregoing mobile computing systems, wherein the lighting component is a software app.

Supported embodiments include a computer-implemented method, a system, a computer-readable storage medium, and/or means for implementing and/or performing any of the foregoing mobile computing systems or portions thereof.

Supported embodiments include a computer-implemented method for participating in an interactive event with a mobile device having a lighting component, a first wearable accessory having a first lighting device, and a second wearable accessory having a second lighting device, the computer-implemented method comprising: transmitting instructions from the mobile device lighting component to the first wearable accessory to light the first lighting device, and transmitting instructions from the mobile device lighting component, upon activation of the mobile device lighting component, to the second wearable accessory to light the second lighting device.

Supported embodiments include the foregoing computer-implemented method, wherein the mobile device, the first wearable accessory, and the second wearable accessory are in close proximity to one another.

Supported embodiments include any of the foregoing computer-implemented methods, wherein the mobile lighting device component transmitting instructions to the first wearable accessory to light the first lighting device before the interactive event.

Supported embodiments include any of the foregoing computer-implemented methods, wherein the mobile lighting device component transmitting instructions to the first wearable accessory to light the first lighting device during the interactive event.

Supported embodiments include any of the foregoing computer-implemented methods, wherein: the mobile device is a smartphone, and the first wearable accessory and second wearable accessory are identical to one another.

Supported embodiments include any of the foregoing computer-implemented methods, wherein the first wearable accessory and the second wearable accessory are bracelets.

Supported embodiments include an apparatus, a system, a computer-readable storage medium, and/or means for implementing and/or performing any of the foregoing computer-implemented methods or portions thereof.

Supported embodiments include a mobile computing system for participating in an interactive event comprising: a wearable accessory having a sensor, a mobile device communicating with the wearable accessory, and a server having a social media platform thereon connected to the mobile device over a network, wherein the sensor responds to an impulse to trigger the wearable accessory, wherein the wearable accessory sends a message to the mobile device to communicate with the server over the network to post output on the social media platform.

Supported embodiments include the foregoing mobile computing system, wherein the wearable accessory is an item selected from the group consisting of a wristband and a bracelet.

Supported embodiments include any of the foregoing mobile computing systems, wherein the mobile device is a smartphone.

Supported embodiments include any of the foregoing mobile computing systems, wherein the wearable accessory includes a board having a processor and a power source.

Supported embodiments include any of the foregoing mobile computing systems, wherein the power source includes a battery.

Supported embodiments include any of the foregoing mobile computing systems, wherein the wearable accessory includes a reset switch.

Supported embodiments include any of the foregoing mobile computing systems, wherein the impulse is a clap.

Supported embodiments include any of the foregoing mobile computing systems, wherein the output is selected from the group consisting of a status update, a like, a photo, a video, and a hyperlink.

Supported embodiments include a computer-implemented method, a system, a computer-readable storage medium, and/or means for implementing and/or performing any of the foregoing mobile computing systems or portions thereof.

Supported embodiments include a computer-implemented method for participating in an interactive event with a wearable accessory having a sensor, a mobile device, a server having a social media platform thereon, and a network, the method comprising: coupling the mobile device to the wearable accessory, connecting the mobile device to the server over the network, detecting an impulse with the wearable accessory sensor, and sending a message to the mobile device from the wearable accessory upon detection of the impulse to communicate with the server to post a status update on the social media platform.

Supported embodiments include the foregoing computer-implemented method, wherein the wearable accessory is an item selected from the group consisting of a wristband and a bracelet.

Supported embodiments include any of the foregoing computer-implemented methods, wherein the mobile device is a smartphone.

Supported embodiments include any of the foregoing computer-implemented methods, wherein the wearable accessory includes a board having a processor and a power source.

Supported embodiments include any of the foregoing computer-implemented methods, wherein the power source includes a battery.

Supported embodiments include any of the foregoing computer-implemented methods, wherein the wearable accessory includes a reset switch.

Supported embodiments include any of the foregoing computer-implemented methods, wherein the impulse is a clap.

Supported embodiments include any of the foregoing computer-implemented methods, wherein the output is selected from the group consisting of a status update, a like, a photo, a video, and a hyperlink.

Supported embodiments include a mobile computing system comprising a processor configured to execute computer-executable instructions; and memory storing computer-executable instructions configured to: couple a mobile device to a wearable accessory, connect the mobile device to a server over a network, detect an impulse with the wearable accessory sensor, and communicate with the server upon detection of the impulse to post a status update on the social media platform.

Supported embodiments include the foregoing mobile computing system, wherein the output is selected from the group consisting of a status update, a like, a photo, a video, and a hyperlink.

Supported embodiments include a computer-implemented method, a system, a computer-readable storage medium, and/or means for implementing and/or performing any of the foregoing mobile computing systems or portions thereof.

Supported embodiments include a computing system for participating in a live, interactive event comprising: a first wearable accessory having a first lighting device, a mobile device in close proximity to the first wearable accessory and having a lighting component communicating via a coded a promiscuous broadcast with the first wearable accessory to instruct the first wearable accessory to light the first lighting device, and a second wearable accessory in close proximity to the mobile device and having a second lighting device, wherein the mobile device lighting component can communicate with the second wearable accessory to instruct the second wearable accessory to light the second lighting device, and wherein the mobile device lighting component sends the same message via the coded promiscuous broadcast to the first wearable accessory and the second wearable accessory.

Supported embodiments include the foregoing mobile computing system, wherein the mobile device lighting component can be activated to communicate with the second wearable accessory via the coded promiscuous broadcast to instruct the second wearable accessory to light the second lighting device.

Supported embodiment include any of the foregoing mobile computing systems, wherein the mobile device is a smartphone.

Supported embodiment include any of the foregoing mobile computing systems, wherein the first wearable accessory and second wearable accessory are assigned identification numbers that are stored in memory and the message includes the identification number of at least one of the first wearable accessory and the second wearable accessory.

Supported embodiment include any of the foregoing mobile computing systems, wherein the first wearable accessory and the second wearable accessory are bracelets.

Supported embodiment include any of the foregoing mobile computing systems, wherein the first wearable accessory includes a board having a processor and a power source.

Supported embodiment include any of the foregoing mobile computing systems, wherein the power source includes a battery.

Supported embodiment include any of the foregoing mobile computing systems, wherein the first lighting device is a light emitting diode.

Supported embodiment include any of the foregoing mobile computing systems, wherein the second lighting device is a light emitting diode.

Supported embodiment include any of the foregoing mobile computing systems, wherein the lighting component is a software app.

Supported embodiment include any of the foregoing mobile computing systems, wherein the message includes a flag to activate the lighting component on the second wearable accessory.

Supported embodiments include a computer-implemented method, a system, a computer-readable storage medium, and/or means for implementing and/or performing any of the foregoing mobile computing systems or portions thereof.

Supported embodiments include a computer-implemented method for participating in an interactive event with a mobile device having a lighting component, a first wearable accessory having a first lighting device, and a second wearable accessory having a second lighting device, the computer-implemented method comprising: transmitting instructions via a coded promiscuous broadcast from the mobile device lighting component to the first wearable accessory to light the first lighting device through a message, and transmitting instructions via a coded promiscuous broadcast from the mobile device lighting component, to the second wearable accessory to light the second lighting device through the same message.

Supported embodiments include the foregoing computer-implemented method, wherein the mobile device, the first wearable accessory, and the second wearable accessory are in close proximity to one another.

Supported embodiments include any of the foregoing computer-implemented methods, wherein the mobile lighting device component transmitting instructions to the first wearable accessory to light the first lighting device before the interactive event.

Supported embodiments include any of the foregoing computer-implemented methods, wherein the mobile lighting device component transmitting instructions to the first wearable accessory to light the first lighting device during the interactive event.

Supported embodiments include any of the foregoing computer-implemented methods, wherein: the mobile device is a smartphone, and the first wearable accessory and second wearable accessory are assigned unique identification number that are stored in memory and the message includes the unique identification number of at least one of the first wearable accessory and the second wearable accessory.

Supported embodiments include any of the foregoing computer-implemented methods, wherein the first wearable accessory and the second wearable accessory are bracelets.

Supported embodiments include an apparatus, a system, a computer-readable storage medium, and/or means for implementing and/or performing any of the foregoing computer-implemented methods or portions thereof.

Supported embodiments include a method for participating in an interactive event comprising: providing a mobile device having a lighting component, a first wearable accessory having a first lighting device and a first identification number stored in memory thereon, and a second wearable accessory having a second lighting device and a second identification number stored in memory thereon, transmitting instructions via a coded promiscuous broadcast from the mobile device lighting component in a message to the first wearable accessory to light the first lighting device with the message containing the first identification number, and transmitting instructions via a coded promiscuous broadcast from the mobile device lighting component to the second wearable accessory to light the second lighting device in the same message that was sent to the first wearable accessory.

Supported embodiments include the foregoing method, wherein the message includes a flag for activating the second lighting device.

Supported embodiments include any of the foregoing methods, wherein the mobile device is a smartphone.

Supported embodiments include an apparatus, a system, a computer-readable storage medium, and/or means for implementing and/or performing any of the foregoing methods or portions thereof.

Supported embodiments of the audience interaction system can provide various attendant and/or technical advantages in terms of improved efficiency and/or savings. By way of illustration and not limitation, various features and implementations of the systems and methods in accordance with the described subject matter offer many benefits, which include the incorporation of low-cost wearable accessories with minimal power use into the audience of interaction system. Typically, the wearable accessories can cost less than 55.00 to produce, including packaging and identification tags.

Supported embodiments include audience interaction systems that utilize wearable accessories that include battery power lasting no more than ten days. Supported embodiments include systems that utilize light emitting diodes that have a burn time of between about four to six hours. Supported embodiments include systems that utilize recyclable wearable accessories with short functional lifespans or disposable wearables designed for minimal environmental impact.

Supported embodiments include wearable accessories with designs tailored to use cost-cutting measures, such as limiting the number of layers in printed circuit boards, limiting components to a single side of the wearable accessory, or selecting lower cost components with the intention of building devices with limited lives and/or maximum recyclability and disposability.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

It should be understood that the phrases "mobile computing device" and "mobile device" can be used interchangeably for the purposes of this disclosure.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computing system for participating in a live, interactive event comprising:
    a first wearable accessory having a first lighting device and a first identification number stored in memory thereon;
    a second wearable accessory having a second lighting device and a second identification number stored in memory thereon; and
    a smartphone having a smartphone lighting component wirelessly transmitting via a coded promiscuous broadcast a first message containing a code therein;
    wherein the code is determined by input from a user of the smartphone; and wherein the code can include at least one of the first identification number to instruct the first wearable accessory to light the first lighting device and the second identification number to instruct the second wearable accessory to light the second lighting device.

2. The computing system of claim 1, wherein the smartphone is coupled to the first wearable accessory and is not coupled to the second wearable accessory.

3. The computing system of claim 1, wherein, in response to the first message, the first lighting device lights up and the second lighting device does not light up.

4. The computing system of claim 1, wherein the user input is received directly on the smartphone.

5. The computing system of claim 1, wherein the user input is received by the first wearable accessory and communicated to the smartphone.

6. The computing system of claim 1, wherein the coded promiscuous broadcast includes a flag.

7. The computing system of claim 1, wherein the mobile device lighting component wirelessly transmits via the coded promiscuous broadcast a second message to the first wearable accessory and the second wearable accessory to instruct the second wearable accessory to light the second lighting device, wherein, in response to the second message, the second lighting device lights up.

8. The computing system of claim 7, wherein the second message is sent by the smartphone in response to input from a user of the smartphone.

9. The computing system of claim 8, wherein the user input is received directly on the smartphone.

10. The computing system of claim 8, wherein the user input is received by the first wearable accessory and communicated to the smartphone.

11. The computing system of claim 7, wherein the user can select to light up at least one of the first accessory and the second accessory.

12. The computing system of claim 11, wherein the user can select color and flash pattern and select to light up the first accessory or to light up the second accessory.

13. The computing system of claim 11, wherein, if the user is not logged into the app, then the user can light up the first wearable accessory but not the second wearable accessory.

14. The computing system of claim 1, wherein the smartphone lighting component is an app.

15. The computing system of claim 14, wherein, if the user is logged into the app, then the user can light up the first wearable accessory and the second wearable accessory.

16. The computing system of claim 1 wherein, in response to the first message sent to the first wearable accessory and the second wearable accessory, the first wearable accessory lights up for a first amount of time and the second wearable accessory lights up for a second amount of time less than the first amount of time.

17. The computing system of claim 1 wherein the first wearable accessory includes a motion sensor that detects impulses that can trigger the first wearable accessory to alert the smartphone via that a movement has been sensed and, in turn, the smartphone post status updates on social media.

18. A computing system for participating in a live, interactive event comprising:
- a first wearable accessory having a first lighting device and a first identification number stored in memory thereon;
- a second wearable accessory having a second lighting device and a second identification number stored in memory thereon; and
- a smartphone having a smartphone lighting component wirelessly transmitting via a promiscuous broadcast a first message containing a flag therein;
- wherein the flag is determined by input from a user of the smartphone; and
- wherein the flag can correspond to at least one of the first identification number to instruct the first wearable accessory to light the first lighting device and the second identification number to instruct the second wearable accessory to light the second lighting device.

* * * * *